May 19, 1925.  1,538,595
W. SCHROEDER
STAGING AND CLAMP FOR THE ERECTION THEREOF
Filed Oct. 27, 1923
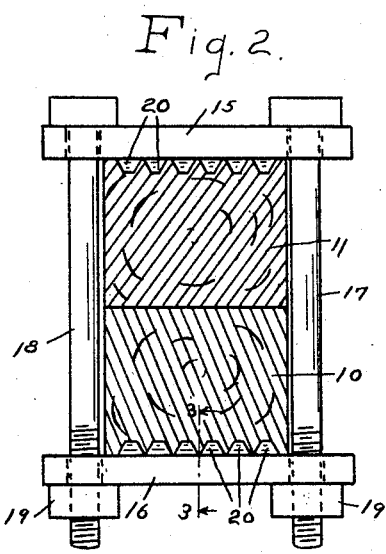
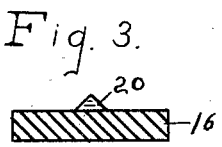
INVENTOR.
William Schroeder
BY
Erwin, Wheeler & Woolard
ATTORNEYS.

Patented May 19, 1925.

1,538,595

UNITED STATES PATENT OFFICE.

WILLIAM SCHROEDER, OF MILWAUKEE, WISCONSIN.

STAGING AND CLAMP FOR THE ERECTION THEREOF.

Application filed October 27, 1923. Serial No. 671,249.

*To all whom it may concern:*

Be it known that WILLIAM SCHROEDER, a citizen of the United States, residing at Milwaukee, county of Milwaukee, and State of Wisconsin, has invented new and useful Improvements in Staging and Clamps for the Erection Thereof, of which the following is a specification.

This invention relates to improvements in staging and clamps for the erection thereof.

Heretofore in the erection of staging and false work, such as is used in building construction, it has been customary to fasten upright timbers together in end to end abutment by nailing cleats or short strips to each of said timbers on each of the four sides thereof. The provision of the short strips for thus securing two uprights in end to end abutment has involved a very considerable expense and has required the expenditure of a large amount of time and labor to complete the nailing incident to such a construction. It is the primary object of the present invention to avoid the greater portion of all such expense, time, and labor by the provision of a simple, economically constructed clamp susceptible of ready attachment to secure any two upright members in any desired position of relative vertical adjustment.

It is a further very important object of this invention to provide a clamp for the purpose aforesaid which will be so designed that it cannot slip and cannot permit any slipping to occur between a pair of uprights secured by it.

In the drawings:

Fig. 1 is a fragmental perspective view of staging including uprights clamped together and embodying this invention.

Fig. 2 is a plan view of the clamp illustrated in Fig. 1, the clamp being shown on an enlarged scale and the upright members illustrated in Fig. 1 being shown in transverse section.

Fig. 3 is a sectional view of the clamp only, a section being taken on line 3—3 of Fig. 2.

Like parts are identified by like reference characters throughout the several views.

The staging shown in Fig. 1 is to be taken as representative of any false work to be used in building operations. It is desired merely to illustrate a pair of uprights clamped together in the manner hereinafter to be described. It will be noted that the uprights 10 and 11 are disposed in mutually overlapping relation and are arranged to support a scaffolding made up of planks 12 and secured by braces 13. It has heretofore been customary to have the members 10 and 11 in end to end abutment and, therefore, when the combined length of said members was greater than the required height of the scaffolding, it was necessary to saw off one or both of the uprights or posts, or else to permit one of said posts to project above the scaffolding. In the present arrangement, however, due to the peculiar clamp hereinafter to be described, it is possible to have the members 10 and 11 in mutually overlapping relation and to adjust the member 11 to any desired height with reference to member 10. Thereby much material is saved in addition to that which is saved incident to the substitution of a metal clamp for the wooden props which have hitherto been nailed to the uprights to secure them together.

The clamp proper comprises a pair of castings 15 and 16 each of which is apertured adjacent its ends to receive bolts 17 and 18. Suitable nuts 19 threaded upon the bolts serve to permit plates 15 and 16 to be adjusted to and from each other whereby to clamp between them any desired upright, such as posts 10 and 11.

It will particularly be noted that the safety of a structure including the clamp is insured by the provision of inwardly directed teeth 20 upon the inner face of each of the castings 15 and 16. These teeth bite into, and become interlocked with the members engaged within the clamp so that any slippage of the clamp relative to the said members is impossible. Inasmuch as neither of the castings 15 or 16 can slip with reference to the wooden member engaged thereby, it will be obvious that any tendency of the wooden members to slip longitudinally with reference to the other can only result in decreasing the horizontal projection of the distance between plates 15 and 16. Thus, the effective clamping pressure of the device would be increased by any tendency for slippage between the uprights. As a matter of fact, actual experiments have shown that if the nuts 19 are turned up with reasonable care, no slippage is possible. A platform constructed substantially like that illustrated in Fig. 1 and supported by means of two uprights joined by a clamp such as that best shown in Fig. 2, has carried without difficulty greater loads than similar parts would be called upon to support under actual working conditions.

In the use of this invention, it is possible to erect staging and false work of all kinds far more rapidly than could be done hitherto. It is a matter of only a few seconds for a workman to slip my improved clamp over a pair of uprights and to secure the nuts 19 to clamp the uprights firmly and rapidly together, whereas, heretofore, it would have been necessary for the workmen to spend many minutes in cutting the uprights to the proper length and then in joining them by means of cleats nailed to their four sides. The whole operation can now be performed very quickly and with no such loss of materials as has occurred hitherto.

A very important item in the expense of scaffolding hitherto erected has been the cost of dismantling the false work. Where the uprights were nailed together by short strips as heretofore, it was necessary either to destroy such strips and hammer in the nails or to pull such nails before the uprights could be separated. In the practical use of the present invention there is no such loss of time or material. The clamps are usable over and over again and so likewise are the uprights engaged between the clamps.

It will be seen from the foregoing that the objects of this invention are fully satisfied by the staging and clamp herein disclosed.

I claim:

In staging, the combination with a pair of uprights in mutual overlapping relation, of a pair of substantially duplicate clamping plates each being formed on one face with means adapted to effect interlocking engagement with one of said uprights, and a pressure device operatively connected with one of said plates and adapted to bear upon the other of said plates to press it in the direction of the first plate whereby to clamp the uprights together and to firmly interlock each of said plates with an upright, said device including substantially duplicate members arranged on opposite sides of the uprights.

WILLIAM SCHROEDER.